US008819217B2

(12) United States Patent
Hussain et al.

(10) Patent No.: US 8,819,217 B2
(45) Date of Patent: *Aug. 26, 2014

(54) INTELLIGENT GRAPH WALKING

(75) Inventors: Muhammad Raghib Hussain, San Jose, CA (US); Rajan Goyal, Saratoga, CA (US); Imrar Badr, Freemont, CA (US)

(73) Assignee: Cavium, Inc., San Jose, CA (US)

( * ) Notice: Subject to any disclaimer, the term of this patent is extended or adjusted under 35 U.S.C. 154(b) by 523 days.

This patent is subject to a terminal disclaimer.

(21) Appl. No.: 11/982,433

(22) Filed: Nov. 1, 2007

(65) Prior Publication Data

US 2009/0119399 A1     May 7, 2009

(51) Int. Cl.
G06F 15/173     (2006.01)
(52) U.S. Cl.
USPC ............... 709/224; 709/225; 706/48; 700/28; 707/6; 707/999.006
(58) Field of Classification Search
USPC .......................................................... 709/224
See application file for complete search history.

(56) References Cited

U.S. PATENT DOCUMENTS

| | | | |
|---|---|---|---|
| 5,230,061 A | 7/1993 | Welch | |
| 5,327,544 A | 7/1994 | Lee et al. | |
| 6,047,283 A | 4/2000 | Braun | |
| 6,076,087 A | 6/2000 | Suciu | |
| 6,192,282 B1 | 2/2001 | Smith et al. | |
| 6,493,698 B1 | 12/2002 | Beylin | |
| 6,925,641 B1 | 8/2005 | Elabd | |
| 6,952,694 B2 | 10/2005 | Mathur et al. | |
| 7,028,141 B2 | 4/2006 | Ohba | |
| 7,046,848 B1 | 5/2006 | Olcott | |
| 7,085,918 B2 | 8/2006 | Sharangpani et al. | |
| 7,093,023 B2 | 8/2006 | Lockwood et al. | |
| 7,185,081 B1 | 2/2007 | Liao | |
| 7,188,168 B1 * | 3/2007 | Liao .............................. | 709/224 |
| 7,225,188 B1 | 5/2007 | Gai et al. | |
| 7,240,048 B2 | 7/2007 | Pontius | |

(Continued)

FOREIGN PATENT DOCUMENTS

EP          1 607 823 A2     12/2005
WO     WO 2004/013777 A1     2/2004

(Continued)

OTHER PUBLICATIONS

Frank Vahid, "The Softening of Hardware," Computer, vol. 36, No. 4, pp. 27-34, Apr. 2003, doi:10.1109/MC.2003.1193225.*

(Continued)

*Primary Examiner* — Phuoc Nguyen
*Assistant Examiner* — June Sison
(74) *Attorney, Agent, or Firm* — Hamilton, Brook, Smith & Reynolds, P.C.

(57) ABSTRACT

An apparatus, and corresponding method, for performing a search for a match of at least one expression in an input stream is presented. A graph including a number of interconnected nodes is generated. A compiler may assign at least one starting node and at least one ending node. The starting node includes a location table with node position information of an ending node and a sub-string value associated with the ending node. Using the node position information and a string comparison function, intermediate nodes located between the starting and ending nodes may be bypassed. The node bypassing may reduce the number of memory accesses required to read the graph.

15 Claims, 7 Drawing Sheets

(56) References Cited

U.S. PATENT DOCUMENTS

| | | | |
|---|---|---|---|
| 7,249,149 | B1 | 7/2007 | Eatherton et al. |
| 7,301,541 | B2 | 11/2007 | Hansen et al. |
| 7,305,372 | B2 | 12/2007 | Bridges et al. |
| 7,308,446 | B1 | 12/2007 | Panigrahy et al. |
| 7,454,588 | B2 | 11/2008 | Greicar |
| 7,565,380 | B1 | 7/2009 | Venkatachary |
| 7,689,530 | B1 | 3/2010 | Williams, Jr. et al. |
| 7,949,683 | B2 | 5/2011 | Goyal |
| 8,180,803 | B2 | 5/2012 | Goyal |
| 8,301,788 | B2 | 10/2012 | Bouchard et al. |
| 8,392,590 | B2 | 3/2013 | Bouchard et al. |
| 8,473,523 | B2 | 6/2013 | Goyal |
| 8,560,475 | B2 | 10/2013 | Hussain et al. |
| 2002/0099909 | A1 | 7/2002 | Meyer |
| 2003/0051043 | A1 | 3/2003 | Wyschogrod et al. |
| 2003/0065800 | A1 | 4/2003 | Wyschogrod et al. |
| 2003/0110208 | A1 | 6/2003 | Wyschogrod et al. |
| 2003/0195874 | A1 | 10/2003 | Akaboshi |
| 2004/0049596 | A1 | 3/2004 | Schuehler et al. |
| 2004/0059443 | A1 | 3/2004 | Sharangpani |
| 2004/0071152 | A1 | 4/2004 | Wolrich et al. |
| 2004/0083387 | A1 | 4/2004 | Dapp et al. |
| 2004/0098384 | A1 | 5/2004 | Min et al. |
| 2004/0162826 | A1* | 8/2004 | Wyschogrod et al. ............ 707/6 |
| 2004/0172234 | A1 | 9/2004 | Dapp et al. |
| 2004/0176945 | A1 | 9/2004 | Inagaki et al. |
| 2004/0179477 | A1 | 9/2004 | Lincoln et al. |
| 2004/0215593 | A1 | 10/2004 | Sharangpani et al. |
| 2004/0225999 | A1 | 11/2004 | Nuss |
| 2004/0250045 | A1 | 12/2004 | Dowling |
| 2004/0267779 | A1 | 12/2004 | Carter et al. |
| 2005/0012521 | A1 | 1/2005 | Sharangpani et al. |
| 2005/0097514 | A1 | 5/2005 | Nuss |
| 2005/0108518 | A1 | 5/2005 | Pandya |
| 2005/0138276 | A1 | 6/2005 | Navada et al. |
| 2005/0238010 | A1 | 10/2005 | Panigrahy et al. |
| 2005/0238022 | A1 | 10/2005 | Panigragy et al. |
| 2005/0240999 | A1 | 10/2005 | Rubin et al. |
| 2005/0251509 | A1 | 11/2005 | Pontius |
| 2005/0273450 | A1 | 12/2005 | McMillen et al. |
| 2006/0059165 | A1 | 3/2006 | Bosloy et al. |
| 2006/0069872 | A1 | 3/2006 | Bouchard et al. |
| 2006/0075206 | A1 | 4/2006 | Bouchard et al. |
| 2006/0085533 | A1* | 4/2006 | Hussain et al. ............... 709/223 |
| 2006/0101195 | A1 | 5/2006 | Jain |
| 2006/0242123 | A1 | 10/2006 | Williams, Jr. |
| 2007/0038775 | A1 | 2/2007 | Parekh et al. |
| 2007/0038798 | A1 | 2/2007 | Bouchard et al. |
| 2007/0133593 | A1* | 6/2007 | Shankara ...................... 370/463 |
| 2007/0276788 | A1 | 11/2007 | Cohen |
| 2008/0046423 | A1* | 2/2008 | Khan Alicherry et al. ....... 707/6 |
| 2008/0263665 | A1 | 10/2008 | Ma et al. |
| 2009/0037379 | A1 | 2/2009 | Bou-Diab et al. |
| 2009/0138440 | A1 | 5/2009 | Goyal et al. |
| 2009/0138494 | A1 | 5/2009 | Goyal et al. |
| 2010/0114973 | A1 | 5/2010 | Goyal |
| 2013/0262518 | A1 | 10/2013 | Goyal |

FOREIGN PATENT DOCUMENTS

| | | |
|---|---|---|
| WO | WO 2006/031659 A2 | 3/2006 |
| WO | WO 2009/070191 A1 | 6/2009 |
| WO | WO 2009/070192 A1 | 6/2009 |

OTHER PUBLICATIONS

Steve McConnell, "Who Needs Software Engineering?," IEEE Software, vol. 18, No. 1, pp. 5-8, Jan./Feb. 2001, doi:10.1109/MS.2001.903148.*

A. Tanenbaum, Structured computer organization; (2nd ed.), Prentice-Hall, Inc., Upper Saddle River, NJ, 1984.*

M. Fisk and G. Varghese, "Fast Content-Based Packet Handling for Intrusion Detection," UCSD technical report CS2001-0670, 2001.*

F. Yu, R. Katz, and T. V. Lakshman, "Gigabit rate packet pattern matching using team," in ICNP, 2004.*

A-Ning Du; Bin-Xing Fang; Xiao-Chun Yun; Ming-Zeng Hu; Xiu-Rong Zheng, "Comparison of stringmatching algorithms: an aid to information content security," Machine Learning and Cybernetics, 2003 International Conference on , vol. 5, No., pp. 2996,3001 vol. 5, Nov. 2-5, 2003 doi: 10.1109/ICMLC.2003.1260090.*

A. N. M. Ehtesham Rafiq, M.Watheq El-Kharashi, and Fayez Gebali. 2004. A fast string search algorithm for deep packet classification. Comput. Commun. 27, 15 (Sep. 2004), 1524-1538. DOI=10.1016/j.comcom.2004.06.005.*

Deshpande, P.S. and Kakde, O.G., "C & Data Structures," Charles River Media: 217-221 [no date available].

Daciuk, J. "Experiments with Automata Compression," Database Inspec [online] The Institution of Electrical Engineers, GB (2000) and Proceedings of Fifth International Conference on Implementation and Application of Automata: 113-119 (Jul. 24, 2000-Jul. 25, 2000).

Anonymous, Graph (data structure) [online] Oct. 2007 [retrieved on Oct. 3, 2007] Retrieved from the Internet URL: http://en.wikipedia.org/w/index.php?title=graph_(data structure) &o. . . .

International Search Report from PCT/US2008/011545 mailed on Mar. 2, 2009.

International Search Report from PCT/US2008/011543 mailed on Mar. 2, 2009.

Written Opinion for PCT/US2008/011545 mailed on Mar. 2, 2009.

Tewari, et al., A Parallel DFA Minimization Algorithm, S. Sahni, et al. (Eds.) HiPC 2002, LNCS 2552, pp. 31-40, 2002.

Ciura, et al., Software-Practice and Experience, 31:1007-1090, 2001.

Dharmapurikar, et al., "Design and Implementation of a String Matching System for Network Intrusion Detection using FPGA-based Bloom Filters," *Washington University Dept. of Computer Science and Engineering*: Technical Report WUCS-2004-012 (2004).

Ramakrishnan, et al., Proceedings of the 2006 Conference on Emperical Methods in Natural Language Processing (EMNLP 2006), pp. 492-500, Sydney, Jul. 2006).

Schuehler, David V., et al., "Architecture for a Hardware-Based, TCIP/IP Content-Processing System," *IEEE Computer Society*, pp. 62-69 (Jan.-Feb. 2004).

Mertz, David, "*Learning to Use Regular Expressions, Introduction to the Tutorial*," Gnosis Software, http://gnosis.cx/publish/programming/regular_expressions.html, pp. 1-16, downloaded Jan. 11, 2005.

Melvin, S., et al., "A Massively Multithreaded Packet Processor," Paper presented at NP2: Workshop on Network Processors, held in conjunction with *The 9th International Symposium on High-Performance Computer Architecture*, Anaheim, CA (Feb. 2003).

International Preliminary Report on Patentability and Written Opinion, PCT/US2008/011545, mailed Jun. 10, 2010.

International Search Report, PCT/US2005/032236, mailed May 16, 2006.

Written Opinion of the International Searching Authority, PCT/US2005/032236, mailed May 16, 2006.

Office Action for U.S. Appl. No. 11/224,728, mailed Jan. 6, 2010.

International Preliminary Report on Patentability and Written Opinion for PCT/US2008/011543, mailed Jun. 10, 2010.

European Examination Report for European Application No. 05812863.8, mailed May 14, 2008.

Alicheny et al., "High Speed Pattern Matching for Network IDS/IPS," IEEE, pp. 187-196, 2006.

Candan et al., "Afilter: Adaptable XML Filtering with Prefix-Caching and Suffix-Caching," VLDB '06 Sep. 12-15, 2006, Seoul, Korea, pp. 559-570.

Office Action, Dated: Jun. 24, 2008 for U.S. Appl. No. 11/224,728.

Final Office Action, Dated: Jan. 22, 2009 for U.S. Appl. No. 11/224,728.

Advisiory Action, Dated: Apr. 16, 2009 for U.S. Appl. No. 11/224,728.

Office Action, Dated: Jun. 10, 2009 for U.S. Appl. No. 11/224,728.

International Preliminary Report on Patentability for PCT/US2005/032236; Date Mailed: Mar. 13, 2007.

Ciura et al., "How to Squeeze a Lexicon," Software—Practice and Experience 2001; 31(11):1-11.

(56) References Cited

OTHER PUBLICATIONS

Lazzara, G., "Automata and performances", Technical Report, XP007921508, 130 pgs. (Jun. 2006).
Bradley, Tony, "Introduction to Intrusion Detection Systems (IDS)," http://netsecurity.about.com/cs/hackertools/a/aa030504.htm and http://searchsecurity.techtarget.com/sDefinition/0,,sid14_gci295031,00.html (Jan. 11, 2005).
Office Action for U.S. Appl. No. 14/040,323 dated Dec. 19, 2013.
Notice of Allowance for U.S. Appl. No. 11/224,728, dated May 29, 2013 entitled: "Content Search Mechanism".
Notice of Allowance for U.S. Appl. No. 11/224,728, dated Sep. 3, 2013 entitled: "Content Search Mechanism".

* cited by examiner

INTELLIGENT GRAPH WALKING

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Network processors are available for high-throughput L2 and L3 network protocol processing, that is, performing packet processing to forward packets at wire-speed. Typically, a general purpose processor is used to process L4-L7 network protocols that require more intelligent processing. Although a general purpose processor can perform the compute intensive tasks, it does not provide sufficient performance to process the data so that it can be forwarded at wire-speed.

Content aware networking requires inspection of the contents of packets at "wire speed." The content may be analyzed to determine whether there has been a security breach or an intrusion. A large number of patterns and rules in the form of regular expressions are applied to ensure that all security breaches or intrusions are detected. A regular expression is a compact method for describing a pattern in a string of characters. The simplest pattern matched by a regular expression is a single character or string of characters, for example, /c/ or /cat/. The regular expression also includes operators and meta-characters that have a special meaning.

Through the use of meta-characters, the regular expression can be used for more complicated searches such as, "abc*xyz". That is, find the string "abc", followed by the string "xyz", with an unlimited number of characters in-between "abc" and "xyz". Another example is the regular expression "abc??abc*xyz;" that is, find the string "abc," followed two characters later by the string "abc" and an unlimited number of characters later by the string "xyz."

An Intrusion Detection System (IDS) application inspects the contents of all individual packets flowing through a network, and identifies suspicious patterns that may indicate an attempt to break into or compromise a system. One example of a suspicious pattern may be a particular text string in a packet followed 100 characters later by another particular text string.

Content searching is typically performed using a search algorithm such as, Deterministic Finite Automata (DFA) to process the regular expression. The DFA processes an input stream of characters sequentially using a DFA graph and makes a state transition based on the current character and state.

SUMMARY

A processor, and corresponding method, to search for a match of at least one expression or sub-expression in an input stream is presented. The processor, and corresponding method, may greatly reduce the number of memory access required to search a graph by employing a bypassing technique. The processor may comprise a compiler configured to generate a graph of expressions including a plurality of interconnected nodes, at least one ending node, and at least one starting node, the starting node further including a comparison command and a location table, the location table including node position information of the at least one ending node and a value of a sub-string between the at least one starting node and the at least one ending node. The processor may also include a memory unit configured to store the graph and a walker process configured to consecutively traverse the nodes of the graph to search for the match of the at least one expression in the input stream. Upon reaching the at least one starting node, the walker process may be configured to detect a common sub-string in the at least one expression and the sub-string value in the location table, using the comparison command. Upon detection of the common sub-string, the walker process may be configured to bypass at least two consecutively interconnected nodes to reach the at least one ending node.

The starting node may be a root node and/or an interconnecting node, the interconnecting node including at least two interconnections to at least two other nodes. The ending node may be a mark node, the mark node indicating a matched expression. The ending node may also be an other starting node.

The walker process may be configured to bypass at least two consecutively interconnected nodes and retrieve node position information of the at least two consecutively interconnected nodes with a single memory access.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1A:
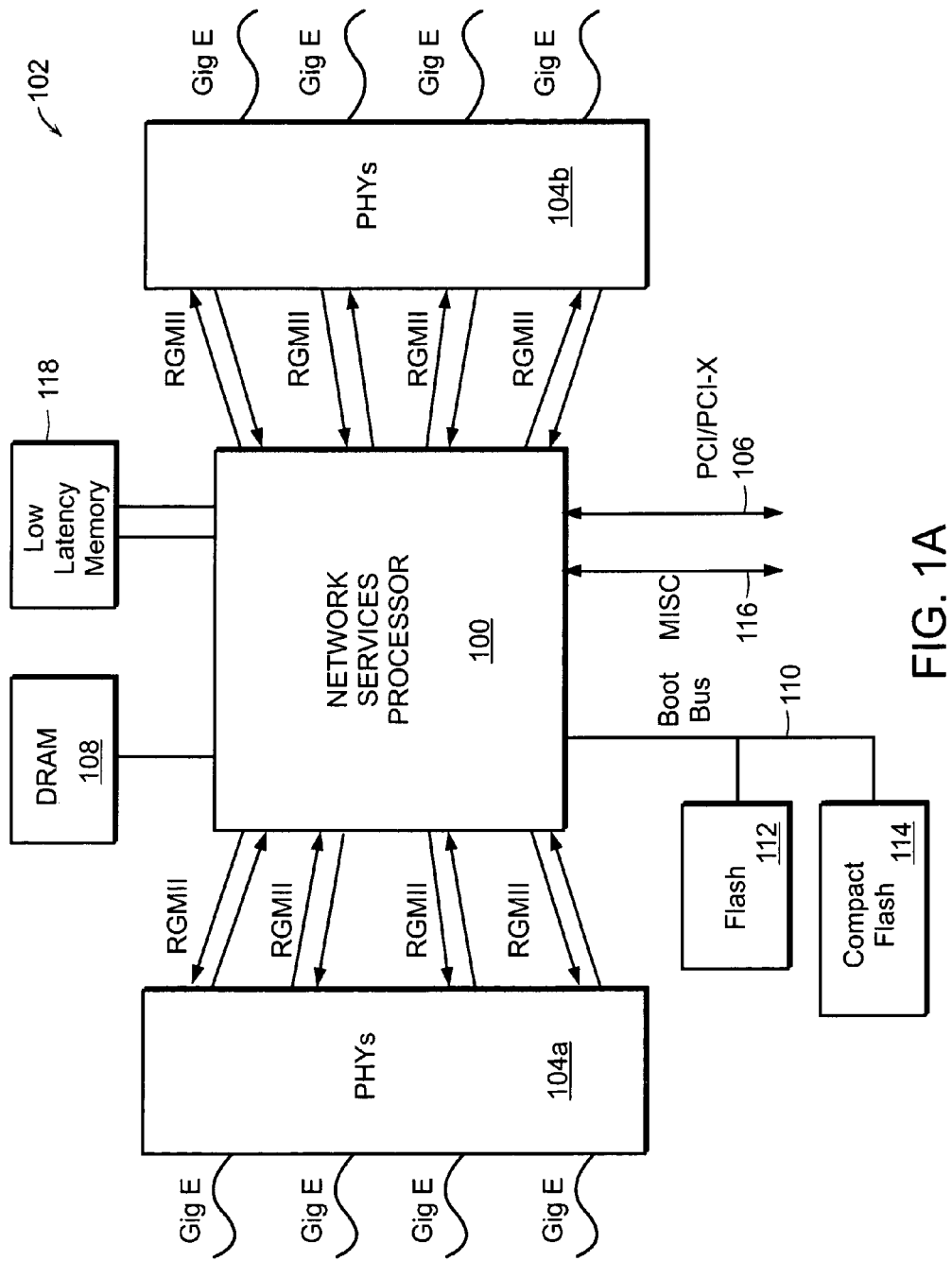
FIGS. 1A and 1B are block diagrams of a security appliance including a network services processor and a protocol processor, respectively.

FIG. 1A is a block diagram of an example security appliance 102 including a network services processor 100. The security appliance 102 may be a standalone system that may switch packets received at ore Ethernet port (Gig E) to another Ethernet port (Gig E) and perform a plurality of security functions on received packets prior to forwarding the packets.

For example, the security appliance 102 may be used to perform security processing on packets received on a Wide Area Network prior to forwarding the processed packets to a Local Area Network.

The network services processor 100 processes Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

The network services processor 100 may include a plurality of Ethernet Media Access Control interfaces with standard Reduced Gigabyte Media Independent Interface (RGMII) connections to the off-chip PHYs 104a, 104b.

The network services processor 100 may also receive packets from the Ethernet ports (Gig E) through the physical interfaces PHY 104a, 104b, and perform L7-L2 network protocol processing on the received packets and forwards processed packets through the physical interfaces 104a, 104b to another hop in the network or the final destination or through the PCI bus 106 for further processing by a host processor. The network protocol processing may include processing of network security protocols such as Firewall, Application Firewall, Virtual Private Network (VPN) including IP Security (IPSec) and/or Secure Sockets Layer (SSL), Intrusion Detection System (IDS) and Anti-virus (AV).

The network services processor 100 may also include a low latency memory controller for controlling low latency Dynamic Random Access Memory (DRAM) 118. The low latency DRAM 118 may be used for Internet Services and Security applications allowing fast lookups, including the string-matching that may be required for Intrusion Detection System (IDS) or Anti Virus (AV) applications and other applications that require string matching.

The network services processor 100 may perform pattern search, regular expression processing, content validation, transformation and security accelerate packet processing according to an embodiment of the present invention. The regular expression processing and pattern search may be used to perform string matching for AV and IDS applications and other applications that require string matching.

A DRAM controller in the network services processor 100 may control access to an external Dynamic Random Access Memory (DRAM) 108 that is coupled to the network services processor 100. The DRAM 108 may store data packets received from the PHYs interfaces 104a, 104b or the Peripheral Component Interconnect Extended (PCI-X) interface 106 for processing by the network services processor 100. In one embodiment, the DRAM interface supports 64 or 128 bit Double Data Rate II Synchronous Dynamic Random Access Memory (DDR II SDRAM) operating up to 800 MHz. The DRAM may also store rules data required for lookup and pattern matching in DFA graph expression searches.

A boot bus 110 may provide the necessary boot code which may be stored in flash memory 112 and may be executed by the network services processor 100 when the network services processor 100 is powered-on or reset. Application code may also be loaded into the network services processor 100 over the boot bus 110, from a device 114 implementing the Compact Flash standard, or from another high-volume device, which can be a disk, attached via the PCI bus.

The miscellaneous I/O interface 116 offers auxiliary interfaces such as General Purpose Input/Output (GPIO), Flash, IEEE 802 two-wire Management Data Input/Output Interface (MDIO), Universal Asynchronous Receiver-Transmitters (UARTs) and serial interfaces.

Figure 1B:
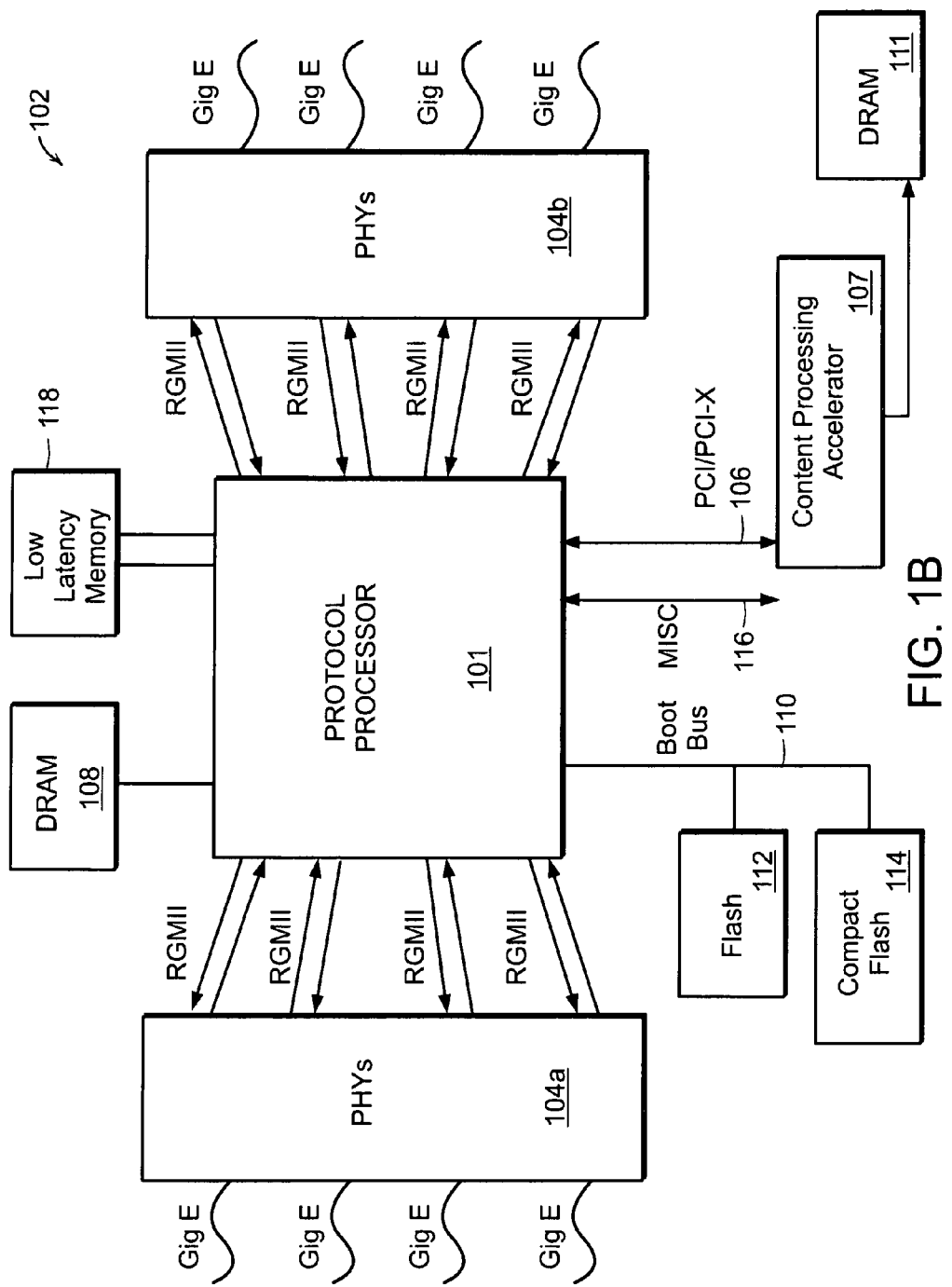

It should be appreciated that the example security appliance 102 may alternatively include a protocol processor 101 (FIG. 1B). The protocol processor 101 may include the elements of the network services processor 100 with the addition of a content processing accelerator 107, connected to the processor 101 via the PCI/PCI-X connection 106, and an external DRAM 111 connected to the accelerator 107. The accelerator 107 and DRAM 111 may be employed in content search applications, therefore making all content searching operations external to the processor 101.

Figure 2:
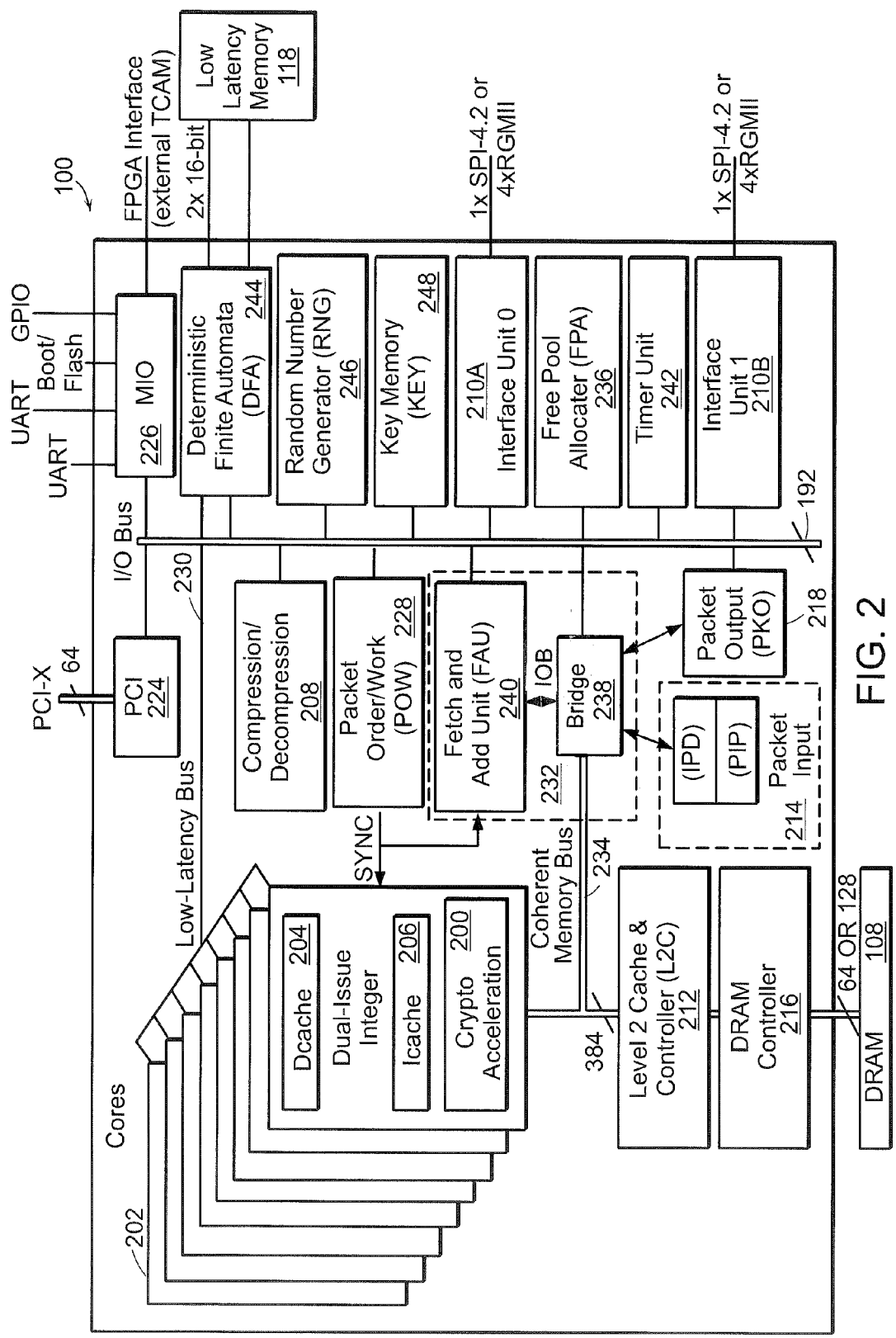
FIG. 2 is a block diagram of the network services processor shown in FIG. 1.

FIG. 2 is a block diagram of the network services processor 100, or the protocol processor 101 shown in FIGS. 1A and 1B, respectively. The network services processor 100, and/or the protocol processor 101, delivers high application performance using a plurality of processors (cores) 202 located on a L1 network protocol. Network applications may be categorized into data plane and control plane operations. Each of the cores 202 may be dedicated to performing data plane or control plane operations. A data plane operation may include packet operations for forwarding packets. A control plane operation may include processing of portions of complex higher level protocols such as Internet Protocol Security (IPSec), Transmission Control Protocol (TCP) and Secure Sockets Layer (SSL). A data plane operation may include processing of other portions of these complex higher level protocols.

A packet may be received by any one of the interface units 210a, 210b through a SPI-4.2 or RGM II interface. A packet may also be received by the PCI interface 224. The interface unit 210a, 210b handles L2 network protocol pre-processing of the received packet by checking various fields in the L2 network protocol header included in the received packet. After the interface unit 210a, 210b has performed L2 network protocol processing, the packet is forwarded to the packet input unit 214. The packet input unit 214 may perform pre-processing of L3 and L4 network protocol headers included in the received packet. The pre-processing includes checksum checks for Transmission Control Protocol (TCP)/User Datagram Protocol (UDP) (L3 network protocols).

The packet input unit 214 may write packet data into buffers in Level 2 cache 212 or DRAM 108 in a format that is convenient to higher-layer software executed in at least one processor 202 for further processing of higher level network protocols. The packet input unit 214 may also support a programmable buffer size and can distribute packet data across multiple buffers to support large packet input sizes.

The Packet order/work (POW) module (unit) 228 may queue and schedule work (packet processing operations) for the processor 202. Work is defined to be any task to be performed by a processor that is identified by an entry on a work queue. The task can include packet processing operations, for example, packet processing operations for L4-L7 layers to be performed on a received packet identified by a work queue entry on a work queue. Each separate packet processing operation is a piece of the work to be performed by a processor on the received packet stored in memory (L2 cache memory 212 or DRAM 108). For example, the work may be the processing of a received Firewall/Virtual Private Network (VPN) packet. The processing of a Firewall/VPN packet may include the following separate packet processing operations (pieces of work): (1) defragmentation to reorder fragments in the received packet; (2) IPSec decryption; (3) IPSec encryption; and (4) Network Address Translation (NAT) or TCP sequence number adjustment prior to forwarding the packet.

The network services processor 100, and/or the protocol processor 101, may also include a memory subsystem. The memory subsystem may include level 1 data cache memory 204 in each processor 202, instruction cache in each processor 202, level 2 cache memory 212, a DRAM controller 216 for external DRAM memory and the interface 230 to external low latency memory 118. The memory subsystem is architected for multi-processor support and tuned to deliver both high-throughput and low-latency required by memory intensive content networking applications. Level 2 cache memory 212 and external DRAM memory 108 (FIG. 1) may be shared by all of the processors 202 and I/O co-processor devices.

The network services processor 100, and/or the protocol processor 101, may also include application specific co-processors that offload the processors 202 so that the network services processor achieves high-throughput. The application specific co-processors include a DFA co-processor 244 that performs Deterministic Finite Automata (DFA) and a compression/decompression co-processor 208 that performs compression and decompression.

Each processor 202 may be a dual-issue, superscalar processor with instruction cache 206, Level 1 data cache 204, built-in hardware acceleration (crypto acceleration module) 200 for cryptography algorithms with direct access to low latency memory over the low latency memory bus 230. The low-latency direct-access path to low latency memory 118 bypasses the L2 cache memory 212 and can be directly accessed from both the processors (cores) 202 and a DFA co-processor 244. In one embodiment, the latency to access the low-latency memory is less than 40 milliseconds.

Prior to describing the operation of the content search macros used for regular expression processing and pattern search in further detail, the other modules in the network services processor 100 will be described. In an example, after the packet has been processed by the processors 202, a packet output unit (PKO) 218 reads the packet data from L2 cache or DRAM, performs L4 network protocol post-processing (e.g., generates a TCP/UDP checksum), forwards the packet through the interface unit 210a, 210b and frees the L2 cache 212 or DRAM 108 locations used to store the packet.

Each processor 202 is coupled to the L2 cache by a coherent memory bus 234. The coherent memory bus 234 is the communication channel for all memory and I/O transactions between the processors 202, an I/O Bridge (IOB) 232 and the Level 2 cache and controller 212.

A Free Pool Allocator (FPA) 236 maintains pools of pointers to free memory in level 2 cache memory 212 and DRAM 108. A bandwidth efficient (Last In First Out (LIFO)) stack is implemented for each free pointer pool. If a pool of pointers is too large to fit in the Free Pool Allocator (FPA) 236, the Free Pool Allocator (FPA) 236 builds a tree/list structure in level 2 cache 212 or DRAM 108 using freed memory in the pool of pointers to store additional pointers.

The I/O Bridge (IOB) 232 manages the overall protocol and arbitration and provides coherent I/O partitioning. The IOB 232 includes a bridge 238 and a Fetch and Add Unit (FAU) 240. The bridge 238 includes buffer queues for storing information to be transferred between the I/O bus, coherent memory bus, the packet input unit 214 and the packet output unit 218.

The Fetch and Add Unit (FAU) 240 is a 2 KB register file supporting read, write, atomic fetch-and-add, and atomic update operations. The Fetch and Add Unit (FAU) 240 can be accessed from both the processors 202 and the packet output unit 218. The registers store highly-used values and thus reduce traffic to access these values. Registers in the FAU 240 are used to maintain lengths of the output queues that are used for forwarding processed packets through the packet output unit 218.

The PCI interface controller 224 has a DMA engine that allows the processors 202 to move data asynchronously between local memory in the network services processor and remote (PCI) memory in both directions.

Typically, content aware application processing utilizes a Deterministic Finite Automata (DFA) to recognize a pattern in the content of a received packet. The DFA is a finite state machine, that is, a model of computation including a set of states, a start state, an input alphabet (set of all possible symbols) and a transition function that maps input symbols and current states to a next state. Computation begins in the start state and changes to new states dependent on the transition function. The DFA is deterministic, that is, the behavior can be completely predicted from the input. The pattern is a finite number of strings of characters (symbols) to search for in the input stream (string of characters).

The pattern is commonly expressed using a regular expression that includes atomic elements, for example, normal text characters such as, A-Z, 0-9 and meta-characters such as, *, ˆ and |. The atomic elements of a regular expression are the symbols (single characters) to be matched. These are combined with meta-characters that allow concatenation (+) alternation (|), and Kleene-star (*). The meta-character for concatenation is used to create multiple character matching patterns from a single character (or sub-strings) while the meta-character for alternation (|) is used to create a regular expression that can match any of two or more sub-strings. The meta-character Kleene-star (*) allows a pattern to match any number, including no occurrences of the preceding character or string of characters. Combining different operators and single characters allows complex expressions to be constructed. For example, the expression (th(is|at)*) will match the following character strings: th, this, that, thisis, thisat, thatis, or thatat.

The character class construct [ . . . ] allows listing of a list of characters to search for, e.g. gr[ea]y looks for both grey and gray. A dash indicates a range of characters, for example, [A-Z]. The meta-character '.' matches any one character.

The input to the DFA state machine is typically a string of (8-bit) bytes, that is, the alphabet is a single byte (one character or symbol). Each byte in the input stream results in a transition from one state to another state.

The states and the transition functions can be represented by a graph, where each node in the graph represents a state and arcs in the graph represent state transitions. The current state of the state machine is represented by a node identifier that selects a particular graph node. The graph may be stored in low latency memory 118, or the main DRAM 108, and accessed by the processors 202 over the low latency bus. The processors 202 may access a DFA-based graph stored in the low latency memory, or the main DRAM 108, directly. The graph will be described later in conjunction with FIG. 5.

Figure 3:
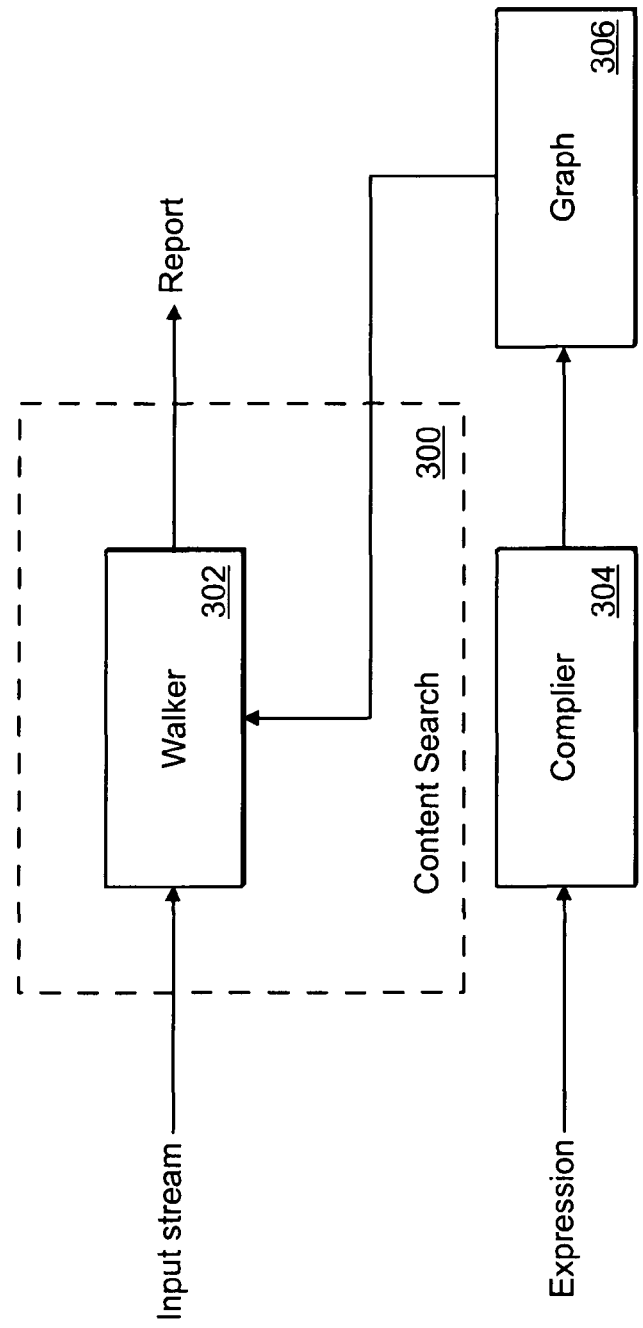
FIG. 3 is a block diagram illustrating content search elements used by the processor of FIGS. 1A and 1B.

FIG. 3 is a block diagram illustrating content search macros that may be used by a processor 202 in the network services processor 100 shown in FIG. 2. Content search macros 300 may include a walker software component (process) 302 for searching the DFA-based content search graph that may be generated via a compiler software component 304. The content search macros 300 may be stored in L2/DRAM (212, 108) and may be executed by a processor 202. The DFA-based content search graph may be stored in low latency memory 118 which is accessible directly by the processor 202 through the low latency bus and low-latency memory controller shown in FIG. 2. The compiler 304 translates expressions into a DFA-based content search graph with a plurality of nodes.

After the compiler 304 has generated the content search graph and the graph stored in low latency memory 118, or in main DRAM 108, the walker process 302 executed by one of the processors 202 walks input data (e.g., a string of characters) in the received data packet one character at a time and outputs a set of matches based on a search for a pattern in the input data using the content search graph.

Figure 4:
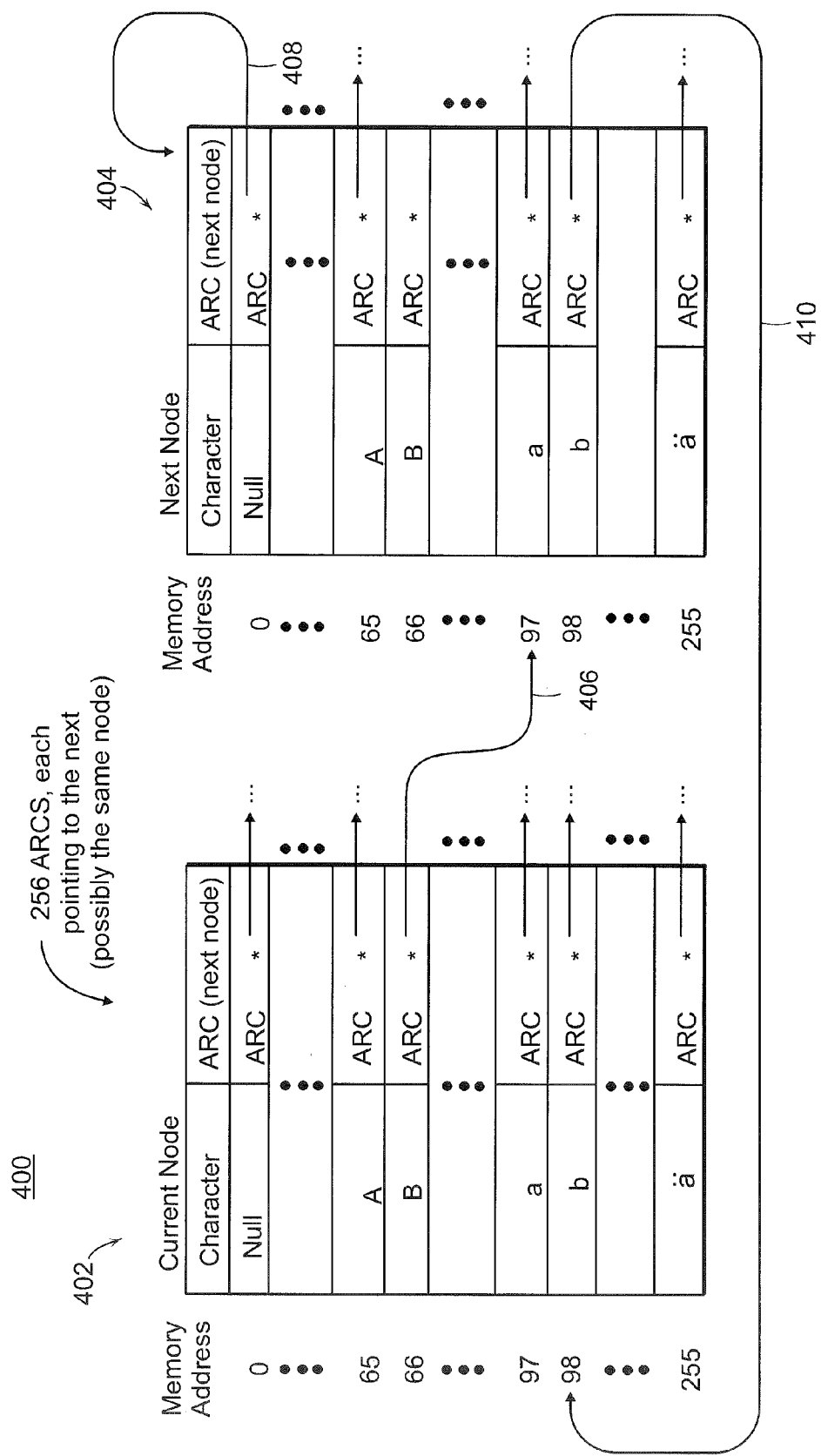
FIG. 4 is a block diagram of an example data structure that is used by the Content Search Mechanism (CSM) to traverse a graph.

FIG. 4 is a block diagram of an example of a typical data structure 400 that may be stored in Low Latency Memory Dynamic Random Access Memory 118, or the main DRAM 108, and used by the Content Search Mechanism (CSM) executing in a processor 202 to traverse a graph. The data structure 400 may be generated by the compiler component 304 based on the expressions to be searched for in the input stream.

The data structure may include a plurality of nodes, for example nodes 402 and 404, that may be used in a content search graph according to an embodiment of the present invention. Each node in the graph may include an array of 256 next node pointers, one for each unique input byte value; that is, $2^8$ (256 possible values, or 256 addresses) representing an ASCII value of the input. Each next node pointer contains a next node ID that directly specifies the next node/state for the input byte value.

As shown in FIG. 4, a current node 402 comprises 256 arcs. Each arc represents an input ASCII value. For example, in node 404, the arc addressed as '97' includes a next node pointer for the character 'a.' Similarly, a next node 404 also comprises 256 arcs, each arc comprising a unique address and including a next node pointer for a corresponding ASCII value.

The arcs of a node may be forward arcs (e.g., arcs which point to next nodes in the DFA graph), backward arcs (e.g., arcs which point back to a root node or a prior node), or repeating arcs (e.g., arcs which point back to the node to which they are associated with). Arc 408 of node 404 comprises a node pointer to node 404, and is therefore an example of a repeating arc. Arc 410 of node 404 comprises a next node pointer to node 402, which in this context is considered to be a prior node, and therefore arc 410 is an example of a backward arc. In the example provided by FIG. 4, the arc addressed as '66' of current node 402 comprises a forward next node pointer 406 pointing to next node 404, representing a character match of 'B' with the input stream. It should be appreciated that although FIG. 4 only shows 2 nodes, any number of nodes may be included in a DFA based content search graph.

Figure 5:
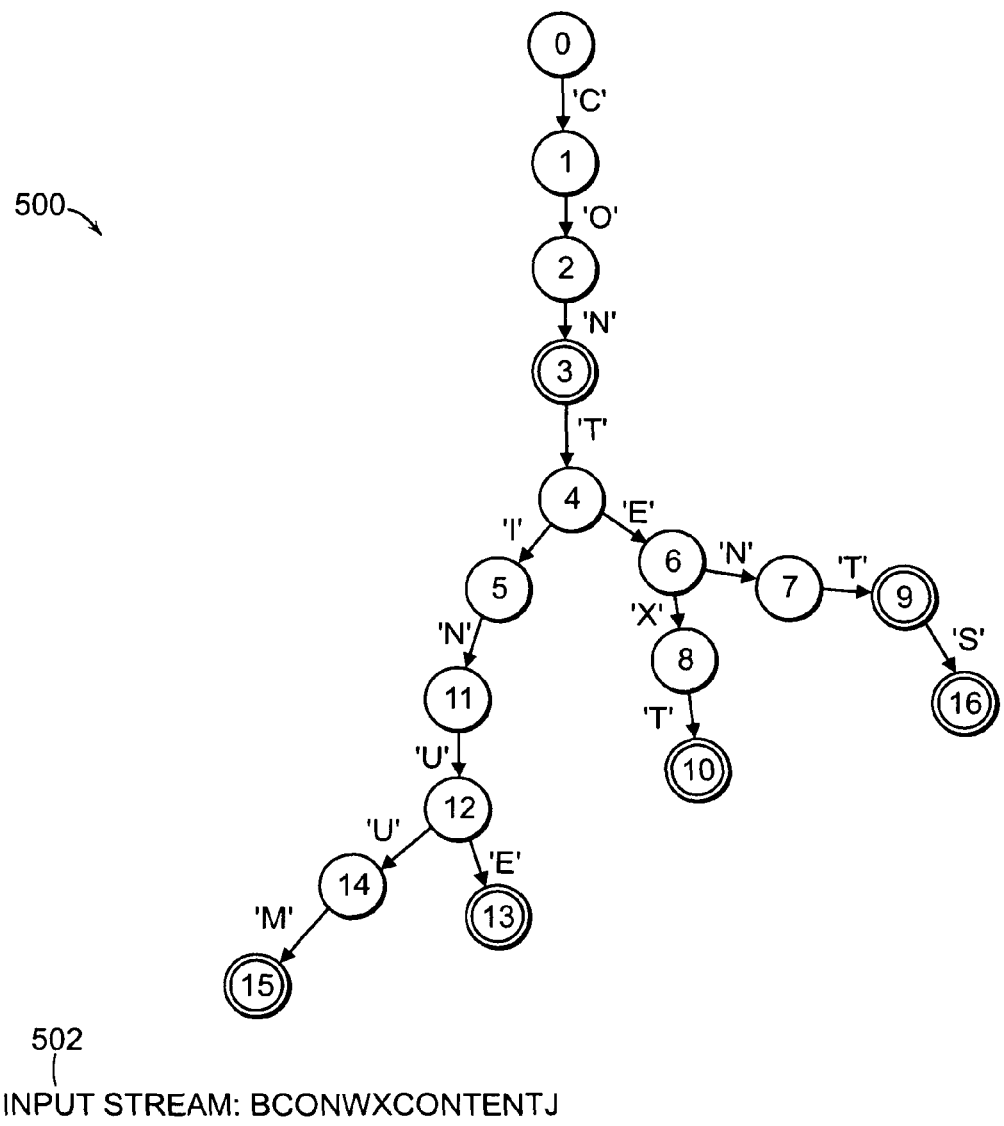
FIG. 5 is an example of a DFA graph.

FIG. 5 provides an example of a DFA graph 500 complied via the compiler 304. For simplicity, only forward arcs have been illustrated in the example graph 500. The node marked as '0' is the root node and is a starting position for traversing the graph 500 with the walker process 302. Each of the nodes are interconnected through arcs represented by the lines connecting each node. The arcs shown in FIG. 5 are forward arcs representing a character match between the expression being searched and an input character. The nodes comprising a double line (e.g., nodes 3, 9, 10, 13, 15, and 16) are referred to as mark nodes and represent a string match in the input stream. For example, the double line around node 3 represents a string match of 'CON'; node 9 represents a string match of 'CONTENT'; node 10 represents a string match of 'CONTEXT'; node 13 represents a string match of 'CONTINUE'; node 15 represents a string match of 'CONTINUUM'; and node 16 representing a string match of 'CONTENTS.' A table 504 illustrates all of the possible expression matches, and the corresponding nodal paths, for the example DFA graph 500.

In operation, the walker process 302 may evaluate the input stream one byte at a time. As an example, consider the input stream 502. The walker 302 evaluates the first character of the input stream 502 which is 'B.' The walker then proceeds to the root node to access the next node pointer associated with the character 'B.' In the example provided by the DFA graph 500, the root node only includes a forward match for the character 'C.' Therefore, the arc associated with the character 'B' is a repeating arc (not shown) comprising a next node pointer pointing back to the root node '0.'

The walker process 302 then proceeds to the next character in the input stream 502 which is 'C.' Upon locating the arc associated with the character 'C,' the walker 302 finds a next node pointer providing a forward match and pointing to node '1.' The walker process 302 then intakes the next input stream character 'O,' and proceeds to find the associated arc and next node pointer providing a forward match and leading to node '3.' Since node '3' is a mark node, the walker process 302 registers that an expression match for the string 'CON' in the input stream has been found.

Depending on the specific IDS application, the walker process 302 may proceed to evaluate the next character in the input stream 502 and analyze the character 'W.' The arc in node '3' associated with the character 'W' comprises a backward next node pointer to the root node '0' since the only forward match associated with node '3' is for the character 'T.' The walker process then proceeds to search for the arc in the root node '0' associated with the current character 'W.' Upon finding that the associated arc is a repeating arc, pointing back to the root node '0,' the walker process 302 proceeds to evaluate the next character in the input stream 502, which is 'X.'

Upon evaluating the next input character 'X,' the associated arc in the root node '0' is a repeating next node pointer since the root node does not comprise a forward match for the character 'X.' Following the same logic discussed above, the walker process 302 may then proceed to find an expression match for the string 'CONTENT' in mark node '9.' Upon reading the next character 'J,' the walker process traverses back to the root node '0' and the arc and next node pointer associated with the character 'J' are read from the root node '0.' Upon detecting a repeating arc and reaching the end of the input stream 502, the walker process 302 completes its walking of the DFA graph 500.

Typically, in the reading of each arc, the walker process 302 makes one access to external memory (e.g., low latency memory 118 or DRAM 108). These external memory accesses may be extremely costly and may require a significant amount of system resources. Therefore, in an embodiment of the present invention, a DFA graph is compiled with location tables in order enable the walker process to bypass nodes in the graph.

Figure 6:
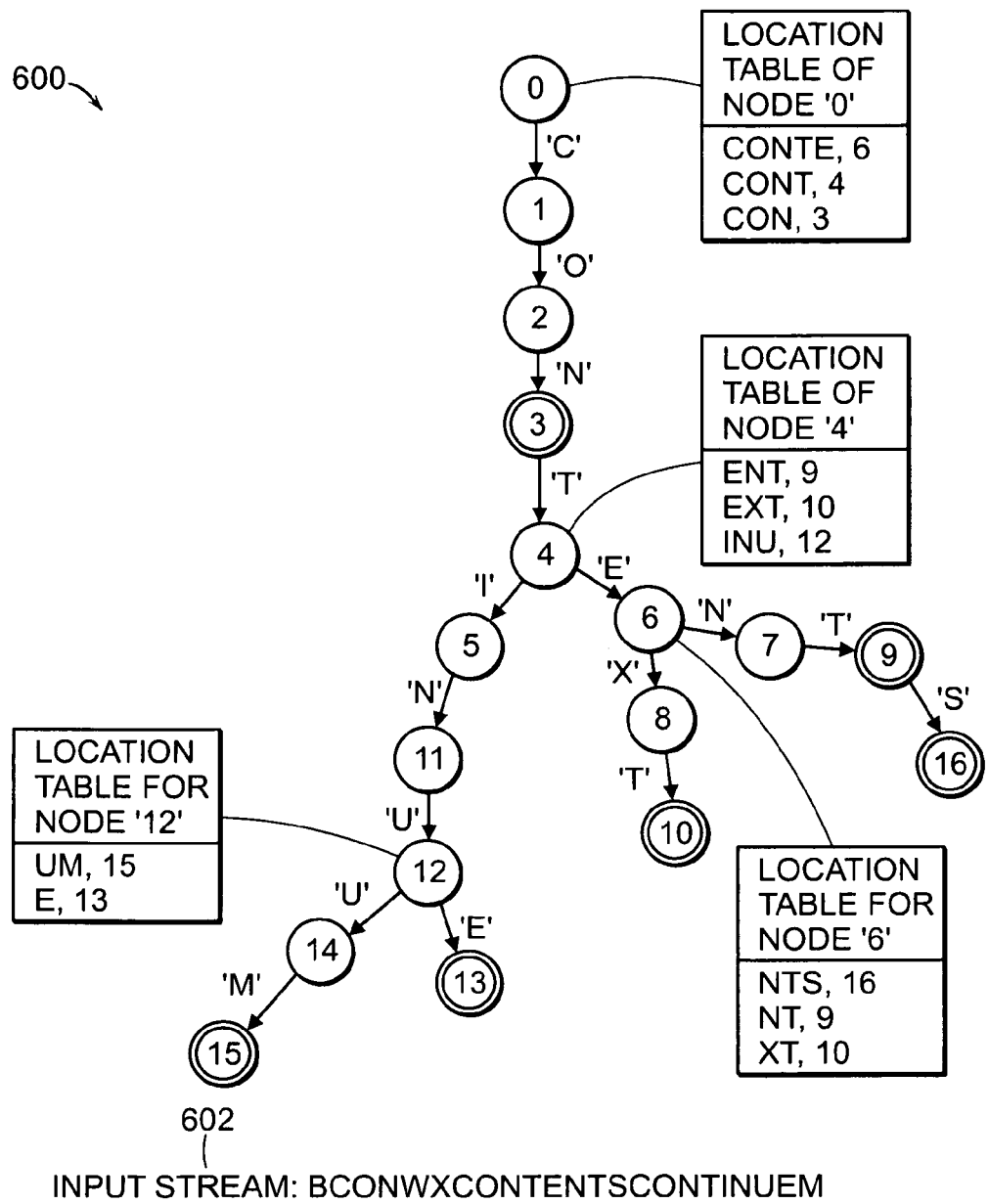
FIG. 6 is an example of a DFA graph according to an embodiment of the present invention.

FIG. 6 illustrates a DFA graph according to an embodiment of the present invention. The DFA graph 600 is similar to the DFA graph 500 of FIG. 5 (e.g., the DFA graph 600 comprises the same expressions to be search as shown in table 504) with the addition of location tables. Nodes '0,' '4,' '6,' and '12' all comprise a location table generated by the compiler 304 during a compiling stage. Nodes '0,' '4,' '6,' and '12' may be considered as starting nodes and the location table of each starting node may comprise a number of string values, with each string value corresponding to a respective ending node. Using the node position information in the location table, the walker process 302 may bypass the nodes interconnected between the starting node and the ending node. It should be appreciated that the compiler 304 may designate any node as a starting and/or ending node.

In operation, the walker process 302 analyzes the first byte of an input stream 602, which is the character 'B.' The walker process 302 then proceeds to traverse the DFA graph 600 starting with the root node '0.' Once the walker processes reaches the root node '0,' the walker process recognizes the root node as a starting node, where each starting node in the DFA graph 600 further comprises a location table. The walker process first looks for the arc associated with the character 'B.' Upon finding the arc and next node pointer associated with the character 'B,' the walker process detects that the arc is a repeating arc pointing back to the root node '0' and proceeds to analyze the next byte in the input stream, which is 'C.' The walker process 302 then proceeds to find the arc and next node pointer associated with the character 'C.'

Upon finding that the arc and next node pointer associated with the character 'C' is a forward arc, the walker process 302 proceeds to search the location table since node '0' has been identified as a starting node. The walker process 302 may comprise a string comparison function which may be configured to compare the location table string values with the characters in the input stream 602. Therefore, since the root node '0' has been recognized as a starting node, the walker process 302 employs its string comparison function starting with the largest string value in the location table 'CONTE.' Since the first string value in the location table of node '0' is five characters long, the string comparison function of the walker process 302 compares the current character 'C' and the four characters following the 'C' character. Therefore, the location table string value 'CONTE' and the input sub-string 'CONWX' is compared.

Since the two strings being compared are not equal, the string comparison function reports a negative match to the walker process 302. Upon receiving the negative match result from the string comparison function, the walker process 302 then proceeds to the next entry in the location table 'CONT.' Similarly, the location table string value 'CONT' and the input sub-string 'CONW' is compared resulting in a negative match.

The walker process 302 then proceeds to use the string comparison function to compare the location table string value 'CON' and the input sub-string 'CON.' This comparison results in a positive string match. It should be appreciated that the walker process 302 may utilize the string comparison function on the entries of the location table in any order. Additionally, the walker process 302 may evaluate any number of entries in the location table at a time.

The walker process 302 may then proceed to obtain the address of the ending node associated with the string value resulting in the position string match, which in this example, the string value 'CON' yields the address of node '3.' Upon, obtaining the address of the ending node associated with the matched string value, the walker process 302 bypasses the DFA graph and traverses directly to the ending node. Therefore, the walker process 302 does not traverse the intermediate nodes '1' and '2' comprised between the starting node '0' and the ending node '3.' Once the walker process 302 reaches node '3' the walker recognizes the node as a mark node and reports that an expression match has been found.

Depending on the application for which the DFA graph is utilized, the walker process 302 may continue to analyze the input stream 602. The next character in the input stream 602 is the character 'W.' The walker process 302 searches node '3' for the arc and next node pointer associated with the character 'W.' Upon obtaining the associated arc, the walker process 302 recognizes the arc as a backward arc and traverses the DFA graph back to the root node '0.' At the root node '0,' the walker process 302 searches for the arc and next node pointer associated with the character 'W.' Upon finding a repeating arc, the walker process 302 will evaluate the next character in the input stream 602. Similarly, the walker process 302 finds that the arc associated with the next input character 'X' as a repeating arc. Thus, the walker process 302 remains in the root node '0' and proceeds to evaluate the next input character.

The next input stream 602 character is 'C.' The walker process 302 proceeds to find the arc and next node pointer associated with the character 'C.' Upon finding that the associated arc is a forward arc, since the root node '0' is identified as a starting node, the walker process 302 proceeds to perform a string comparison on an input stream sub-string and the string values in the location table. Therefore, the first location table string value 'CONTE' is compared with an input sub-string of the same length starting with the current character, 'CONTE.'

The string comparison function provides a positive match result, therefore prompting the walker process 302 to locate the address of the associated end node. Upon locating the address of the associated end node, the walker process 302 proceeds to bypass the DFA graph to node '6.' Thus, the walker process 302 bypasses the intermediate nodes '1'-'4' and traverse the DFA graph directly to node '6.'

Upon reaching node '6' the walker process 302 proceeds to analyze the next character 'N' in the input stream 602 and searches for its associated arc and next node pointer in node '6.' The walker process 302 finds a forward arc associated with the character 'N' and also recognizes node '6' as a starting node. Therefore, the walker process begins the string comparison function starting with the first string value in the location table of node '6.' The string comparison function compares the first location table string value 'NTS' with the input sub-string of the same length starting with the current character, 'NTS.'

The string comparison function provides a positive match result, therefore prompting the walker process 302 to locate the address of the associated end node. Upon locating the address of the associated end node, the walker process 302 proceeds to bypass the DFA graph to node '16.' Thus, the walker process 302 bypasses the intermediate nodes '7' and '9' and traverses the DFA graph directly to node '16.' Since node '16' is a mark node, the walker process 302 detects that an expression match for the string 'CONTENTS' has been found.

The walker process 302 may then analyze the next character in the input stream, which is 'C.' The walker process searches the current node, which is node '16,' for the associated arc and next node pointer. The associated arc and next node pointer points in a backward direction and traverses the walker back to the root node '0.'

Following the same logic, the walker process 302 bypasses the DFA graph from the root node '0' to the node '4' upon finding a string comparison match for the sub-string 'CONT.' Upon analyzing the location table associated with node '4,' the walker process 302 then bypasses to node '12' after detecting a string comparison match for the sub-string 'INU.' At node '12' the walker process may then traverse to node '13,' where an expression match will be detected for the expression 'CONTINUE.'

In the example illustrated by FIG. 6, three expressions have been located. The first expression 'CON' was obtained with a single memory access (e.g., the single memory access of node '3'), the second expression 'CONTENTS' was obtained with three memory accesses (e.g., an access to node '4,' node '9,' and node '16'), the third expression 'CONTINUE' was also obtained with three memory accesses (e.g., an access to node '4,' node '12,' and node '13'). Using the DFA graph traversing method illustrated in FIG. 5, the first expression would have required three memory accesses, the second expression would have required eight memory accesses, and the third expression would have also required eight memory accesses. Therefore, by employing the bypass process illustrated in FIG. 6, the total number of memory accesses may be greatly reduced.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   in a security appliance having a physical interface receiving an input stream:
   generating a graph including a plurality of interconnected nodes, at least one ending node, and at least one starting node, the at least one starting node including a comparison command and a location table, the location table including node position information of the at least one ending node and a value of a sub-string between the at least one starting node and the at least one ending node;
   traversing the plurality of interconnected nodes of the generated graph to search for a match of at least one expression in the input stream;
   upon reaching the at least one starting node in the generated graph and upon finding a forward arc from the at least one starting node, the forward arc representing a match between the at least one expression and a character from the input stream, detecting a common sub-string in the at least one expression and the value of the sub-string in the location table using the comparison command;
   upon detection of the common sub-string, bypassing at least two consecutively interconnected nodes in the generated graph by using the location table included in the at least one starting node to reach the at least one ending node indicated by the node position information of the at least one ending node, wherein the generated graph includes plural ending nodes and the location table includes multiple entries, each entry including node position information of a corresponding ending node of the plural ending nodes and a value of a sub-string between the at least one starting node and the corresponding ending node; and
   using the comparison command to detect a common sub-string in the at least one expression and the value of the sub-string in the location table for each of the multiple entries in any order.

2. The method of claim 1 in which the at least one starting node is a root node.

3. The method of claim 1 in which the at least one starting node is an interconnecting node, the interconnecting node including at least two interconnections to at least two other nodes.

4. The method of claim 1 in which the at least one ending node is a mark node, the mark node indicating a matched expression.

5. The method of claim 1 in which the at least one ending node is an other starting node.

6. The method of claim 5 in which the other starting node is an interconnecting node, the interconnecting node including at least two interconnections to at least two other nodes.

7. The method of claim 1 where bypassing comprises retrieving node position information of the at least two consecutively interconnected nodes with a single memory access.

8. The method of claim 1 further comprising selecting the at least one ending node with a longest common sub-string, a shortest common sub-string, or both.

9. An apparatus comprising:
   a hardware interface configured to receive an input stream;
   a compiler configured to generate a graph including a plurality of interconnected nodes, at least one ending node, and at least one starting node, the at least one starting node including a comparison command and a location table, the location table including node position information of the at least one ending node and a value of a sub-string between the at least one starting node and the at least one ending node;
   a memory communicatively coupled to the compiler and configured to store the generated graph; and
   a walker process communicatively coupled to the hardware interface and configured to:
   traverse the plurality of interconnected nodes of the generated graph to search for a match of at least one expression in the input stream;
   upon reaching the at least one starting node and upon finding a forward arc from the at least one starting node, the forward arc representing a match between the at least one expression and a character from the input stream, the walker process configured to detect a common sub-string in the at least one expression and the value of the sub-string in the location table, using the comparison command;
   upon detection of the common sub-string, bypass at least two consecutively interconnected nodes in the generated graph by using the location table included in the at least one starting node to reach the at least one ending node indicated by the node position information of the at least one ending node, wherein the generated graph includes plural ending nodes and the location table includes multiple entries, each entry including node position information of a corresponding ending node of the plural ending nodes and a value of a sub-string between the at least one starting node and the corresponding ending node; and
   use the comparison command to detect a common sub-string in the at least one expression and the value of the sub-string in the location table for each of the multiple entries in any order.

10. The apparatus of claim 9 in which the at least one starting node is a root node.

11. The apparatus of claim 9 in which the at least one starting node is an interconnecting node, the interconnecting node including at least two interconnections to at least two other nodes.

12. The apparatus of claim 9 in which the at least one ending node is a mark node, the mark node indicating a matched expression.

13. The apparatus of claim 9 in which the at least one ending node is an other starting node.

14. The apparatus of claim 13 in which the other starting node is an interconnecting node, the interconnecting node including at least two interconnections to at least two other nodes.

15. The apparatus of claim 9 in which the walker process is configured to bypass the at least two consecutively interconnected nodes and retrieve node position information of the at least two consecutively interconnected nodes with a single memory access.

\* \* \* \* \*